June 4, 1963   N. NEBOUT ETAL   3,092,016
WIRE TYING MACHINE

Filed Feb. 1, 1960    9 Sheets-Sheet 4

INVENTORS
NOEL NEBOUT
JEAN MISSIOUX
BY *Otto John Munz*
ATTORNEY

June 4, 1963  N. NEBOUT ETAL  3,092,016
WIRE TYING MACHINE

Filed Feb. 1, 1960

INVENTORS
NOEL NEBOUT
JEAN MISSIOUX
BY Otto John Munz
ATTORNEY

June 4, 1963

N. NEBOUT ETAL 3,092,016

WIRE TYING MACHINE

Filed Feb. 1, 1960

INVENTORS
NOEL NEBOUT
JEAN MISSIOUX

BY *Otto John Munz*

ATTORNEY

June 4, 1963   N. NEBOUT ETAL   3,092,016
WIRE TYING MACHINE
Filed Feb. 1, 1960   9 Sheets-Sheet 7

INVENTORS
NOEL NEBOUT
JEAN MISSIOUX
BY
ATTORNEY

INVENTORS
NOEL NEBOUT
JEAN MISSIOUX
BY Otto John Munz
ATTORNEY 3,092,016
Patented June 4, 1963

1

3,092,016
WIRE TYING MACHINE
Nöel Nebout, Montlucon, and Jean Missioux, Puteaux, France, assignors to Societes Aries, La Bougie B.G. & S.F.E.D.R. reunies, Paris, France, a company of France
Filed Feb. 1, 1960, Ser. No. 5,702
Claims priority, application France Feb. 19, 1959
6 Claims. (Cl. 100—7)

The present invention relates to machines for passing a wire around a package made up of a single object or a group of objects, and for tightening and fixing the wire.

Machines are known, for example from French Patent 514,537 or United States Patent 2,733,652, which pass around a package a tie sufficiently flexible to be able to slip over the package and which cause this tie to slip during the encirclement. In general, in this type of tying machine, the package undergoes during the tying, a displacement during which the tie slips over the package.

From United States Patent 2,124,770 or German Patent 1,002,680 for example, tying machines are known which pass a tie around a package without making the tie slip over the package. These machines are often of the type provided with a split ring, as in the last-named United States patent. These machines have the disadvantage that they do not completely disengage the working platform at the moment when the package already tied is removed and replaced by another package to be tied, and this renders difficult the operation of removing packages and placing them in the position for tying.

The general object of the invention is a machine which effects the tying of a package of any section by means of wire, and which fixes in position the wire which is passed around the package by a method of fixing adapted to its character.

A more specific object of the invention is a machine of this type or tying machine, capable of working with a wire which, by reason of its rigidity, cannot slip over the cross-section about which the package is tied.

Another object of the invention is a tying machine of the type able to encircle packages of all dimensions over any tying cross-section which does not exceed a particular gauge.

Another object of the invention is a tying machine capable of tying equally well packages of elongated form as well as packages of annular form.

Another object of the invention is a tying machine of the kind which disengages completely, in its rest position, the work platform, thus allowing an easy and rapid placing of the package to be tied and an equally easy and rapid removal of the package once it has been tied.

Another object of the invention is a tying machine which allows the package to be tied to be brought into the tying position by means of a transverse displacement or a longitudinal displacement.

Another particular object of the invention is a tying machine which, when the wire has been placed around the tying cross-section, presents the outer ends of this wire in a position adapted to the method of fixing by twisting.

Anther object of the invention is a tying machine in which the said end portions of the wire are parallel with each other when the wire has been passed round the tying cross-section.

Another object of the invention is a tying machine effecting the twisting of the wire during the return of the member which has caused the placing of the wire around the tying cross-section.

Another particular object of the invention is a twisting head for a tying machine of the type ensuring the cutting of the wire at a convenient moment.

2

Another object of the invention is a twisting head adapted to turn down the ends of the wire when the twist has been effected.

These various objects are achieved by the tying machine according to the invention, which essentially comprises an articulated member and a doubly slotted twisting head which, in co-operation, cause the positioning of the wire, its cutting and its fixing.

The articulated member is constituted by an angle arm and a forward angle arm terminating by a yoke carrying a grooved pulley over which passes the wire.

The angle arm is rigid with a shaft parallel with the platform of the machine situated at the other side of this platform with respect to the package in position for tying.

The forward angle arm is articulated at the end of this angle arm and its rotation is controlled by a device which makes its orientation independent of that of the angle arm.

The wire passing over the grooved pulley is there given a curvature opposite to that which it has once it is placed around the tying cross-section.

The grooved pulley has a smaller thickness than the diameter of the wire; this arrangement facilitates the gripping of the positioned wire by grippers.

The movement of the articulated member during the operation of tying is controlled by a suitable device, for example by cams, which in particular, satisfy the condition that at the beginning and at the end of the tying operation, the grooved pulley of the forward arm occupies two positions which are substantially symmetrical with respect to the axis of rotation of the twisting head.

In these two positions the grooved pulley over which the wire passes engages in two vertical slots formed in the twisting head.

After withdrawal of the grooved pulley, the cutting and the twisting of the wire, which is held by a suitable arrangement of grippers, is effected by a single device constituted by a fixed grooved column, a rotatable twisting head concentric with the column, and a set of knife blades of which one is carried by the fixed column and the other is carried by the rotatable head.

From United States Patent 2,733,652, for example, tying machines are known which are provided with an arm and a forward arm, which are articulated one to the other and which partly effect the placing of the wire around the package, the latter undergoing in the course of tying a displacement permitted by the flexible nature of the wire. This device of the prior art is unsuitable for the positioning of a stiff type of wire as used in the tying machine of the present invention. Moreover, this known device would not be suitable for the tying of the ends by twisting by means of the doubly slotted twisting head, which in combination with the articulated member constitutes the essence of the present invention.

Referring to a particular embodiment, the tying machine of the invention comprises a split platform, means for placing a package to be tied in position for tying on this platform, a doubly slotted cylindrical twisting head, the axis of which is perpendicular to the platform, placed in register with this tying position, a driving shaft parallel to the platform in the neighbourhood of the said twisting head, a first cranked arm keyed at one end on this shaft and carrying an articulation at its other end, a second cranked arm articulated to the first by one end and carrying a grooved pulley at the other end, a store of wire, a wire from this store passing over the periphery of the second arm and over the grooved pulley and held by a non-return device, two grippers placed between the twisting head and the tying position on both sides of the axis of the said head, the first being on the side of the driving shaft, means for severing the wire, a driving motor and control means driven by the said motor to control the movement of the two arms, the closing of the first and second grippers and the cutting means following a cycle which comprises, starting from an initial position, the insertion of the grooved pulley into the first slot of the head, the closing of the first grippers on the wire, the complete revolution of the grooved pulley around the package to be tied, the insertion of the grooved pulley into the second slot of the head, the closing of the second grippers on the wire, the departure of the grooved pulley from the second slot, the cutting of the wire, the twisting of the wire and the return of the grooved pulley into the initial position. The cutting means are included in the twisting head itself and the control means are, for example, constituted by coaxial cams keyed to a shaft driven by the driving motor.

It is also convenient, in many cases, that the slotted platform should be horizontal, the twisting head being beneath the platform. At the moment when the tying platform is fed, the platform is completely disengaged.

The invention will be better understood from the following description and from an examination of the accompanying figures and drawings which relate to one example of the structure of a tying machine according to the invention. In these figures:

FIGURES 10a, to 15a, 10b to 15b represent plan views and views in elevation of the successive phases of twisting;
FIGURES 12c and 13c relate to the set of blades.

The invention is particularly concerned with the part of a tying machine which passes the wire around the tying section of the package and thereafter ensures the fixing of the wire.

During the actual tying operation, the package is held stationary by appropriate devices which may also serve to carry the package to the tying station and to remove the package once it has been tied. These devices, which do not lie within the scope of the invention, will be described within the framework of a machine represented in its entirety in FIGURE 1a.

Figures 1A, 1B:
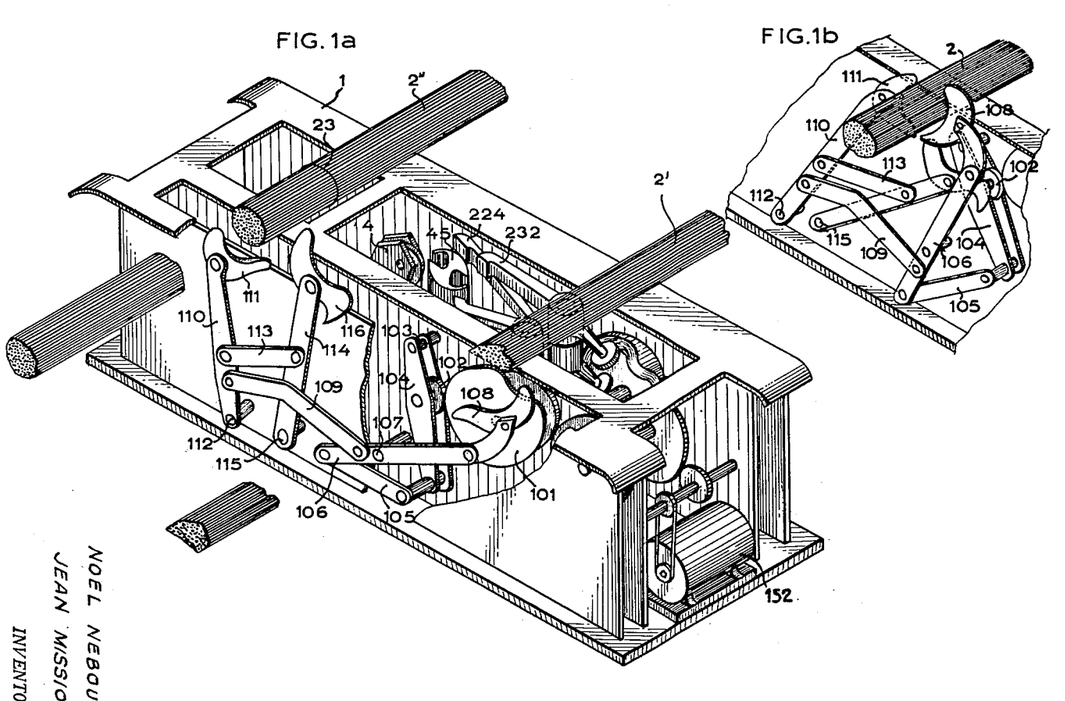
FIGURE 1a is a view of the whole of the machine.
FIGURE 1b is a partial view of the mechanism for holding the package.

In FIGURE 1a, the package 2' to be tied is constituted by an assembly of round iron rods or sections lying on the platform 1. The package 2" which has just been tied by the wire 23 has been pushed to the left by the finger 116 pivoted at the end of the lever 114. The placing of the package 2' to be tied in position for tying will be effected by the pivoted jaws 108 and 111 which, in approaching one towards the other, seize it and hold it during tying in the position shown at 2 in FIGURE 1b.

The jaws 108 and 111 are pivoted on levers 106 and 110 which are freely rotatable on the fixed shafts 107 and 112.

The movement of the lever 110 is linked with that of the lever 106 through the arm 109, and that of the lever 106 is linked with that of a lever 104, articulated on the fixed shaft 103, through the arm 105. The lever 104 carries a roller 102 rolling on a cam 101 of appropriate shape which is rotated by its driving shaft. The contact of the roller 102 with the cam 101 is ensured by a spring device, not shown. The machine assembly is driven by the motor 152.

During the transition from the position shown in FIGURE 1a to that shown in FIGURE 1b, the jaws 108 and 111, moving towards each other, seize the package 2' of bars, and the finger 116 articulated on the lever 114, which is driven by the arm 113, moves to the right of the package to be tied.

During the transition from the position of FIGURE 1b to that of FIGURE 1a, the jaws 108 and 111 open and the finger 116 pushes the tied package to the left.

For a better understanding of the description of the constituent parts relating specifically to the invention, the presence should be noted in FIGURE 1a of the cylindrical head 45, which ensures, as will be explained later, the cutting of the wire and its twisting, of jaws 224 and 232 pertaining to two pincer systems holding the wire during certain tying stages, and of an arm 4 only the end of which is visible.

Figure 2:
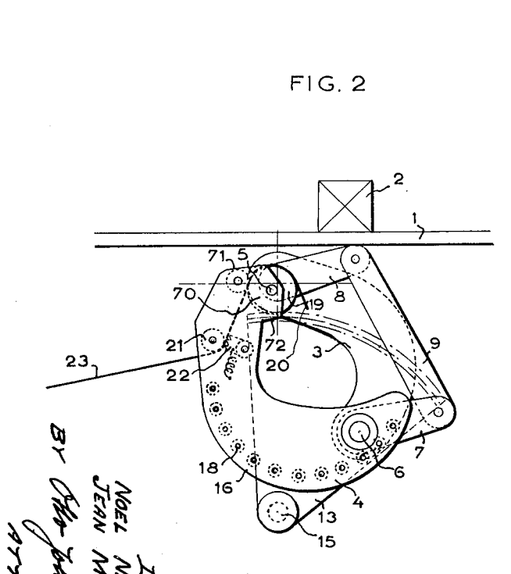
FIGURES 2 to 7 represent the movements of the articulated member through successive stages in the placing of the wire around the object to be tied.

Turning now to FIGURE 2, there is shown at 1 the platform of the tying machine on which is placed the package 2 held in place by means of the jaws members previously mentioned. Below the platform 1 there is a pivoted member constituted by the angle arm 3 and the forward angle arm 4.

The angle arm 3 is fixed to the shaft 5. The forward angle arm 4 is pivoted around the shaft 6 mounted on the movable end of the angle arm 3. A lever 7 fixed to the forward angle arm 4 controls the rotation of the latter around the shaft 6. The lever 7 is held parallel to a lever 8 by means of the arm 9. The lever 8 is controlled by the rotation of a shaft 10, not shown in FIGURE 2, which is coaxial with the shaft 5.

Figure 8:
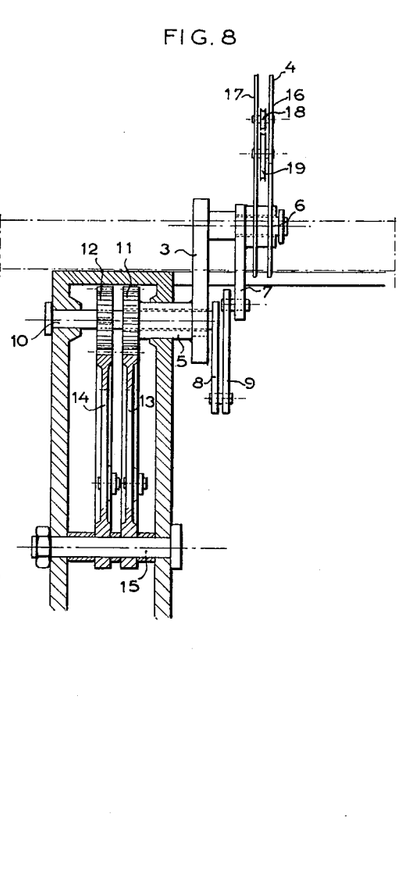
FIGURE 8 is a transverse view of the articulated member and its control devices.

Referring for the moment to FIGURE 8, which is a sectional view, it will be seen that the hollow shaft 5 fixed to the arm 3 is controlled in rotation by the pinion 11 and that the shaft 10 fixed to the lever 8 is controlled in rotation by the pinion 12. The rotation of the pinions 11 and 12 is controlled by toothed sectors 13 and 14 freely mounted about a fixed shaft 15; it will be seen in this figure that the forward angle arm 4 (represented in upper position) is constituted by two parallel and connected webs 16 and 17, provided with rollers such as 18 journaled between them.

Returning to FIGURE 2, the toothed sector 13 is also visible; the forward angle arm 4 ends in a yoke 70 of which the edges 71 and 72 are substantially parallel; this yoke supports a grooved pulley 19; a metallic wire or tie 23 coming from a store (not shown) passes first over a non-return device constituted by a roller 21 and a milled sector 22, then over the grooved pulley 19; the free end 20 of the wire 23 is straight and is directed towards the shaft 6 in the position shown in this figure.

The relative position of the two angle arms 3 and 4 shown in FIGURE 2 corresponds to the starting position of the tying machine.

Figure 3:
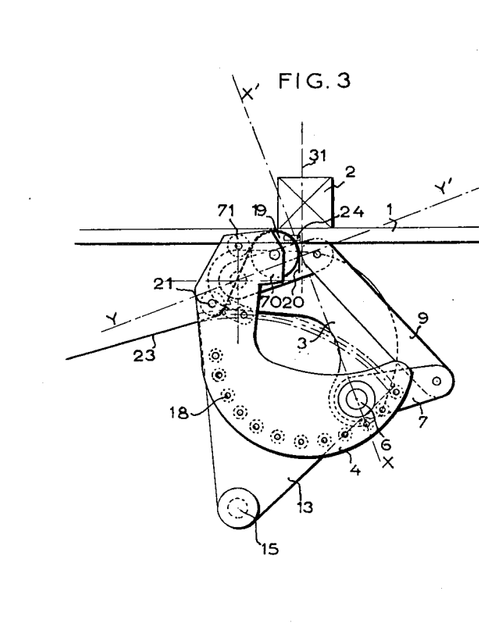

Referring now to FIGURE 3, a suitable rotation of the toothed sectors 13 and 14 has produced a change in the position of the angle arms 3 and 4. The grooved pulley 19 has approached the package 2 to be tied in such a way that a gripping device shown at 24 can seize the end of wire placed around the grooved pulley 19; for this reason, this pulley has a smaller thickness than the diameter of the wire which it carries; it will be seen that, in the position shown in this figure, the end 20 is very near the axis of rotation 31 of the twisting head (not shown in this figure); the upper edge 71 of the yoke 70 is flush with the upper plane of the platform 1.

Figure 4:
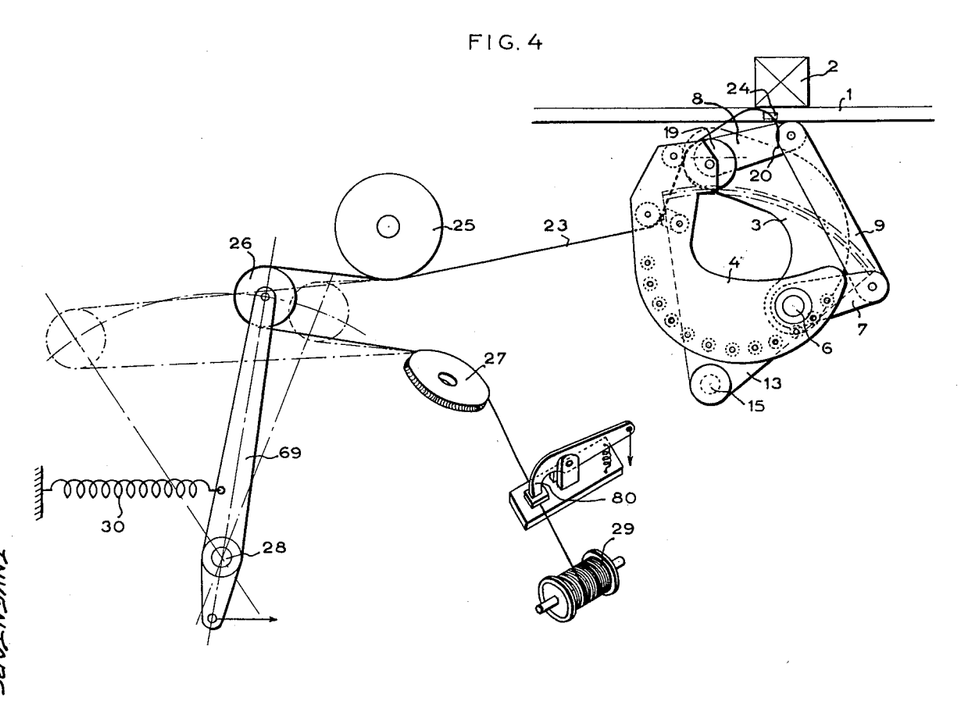

The wire magazine is shown in FIGURE 4; it comprises essentially a first fixed grooved pulley 25, a second grooved pulley 26 mounted at the end of a lever 69, pivoted on a shaft 28, a third grooved pulley 27, a device 80 which regulates the wire feed and a store 29 of wire. The spring 30 acting on the lever 69 has the effect of tensioning the wire.

FIGURE 4 corresponds to the following stage of the tying operation; under the action of rotation of the toothed sectors 13 and 14, the arms 3 and 4 have substantially reverted to the position which they occupied in FIGURE 2. The grooved pulley 19 has withdrawn from the package 2 to return substantially to the level of the shaft 5, the wire 23 being held at its end by the grippers 24.

Figure 5:
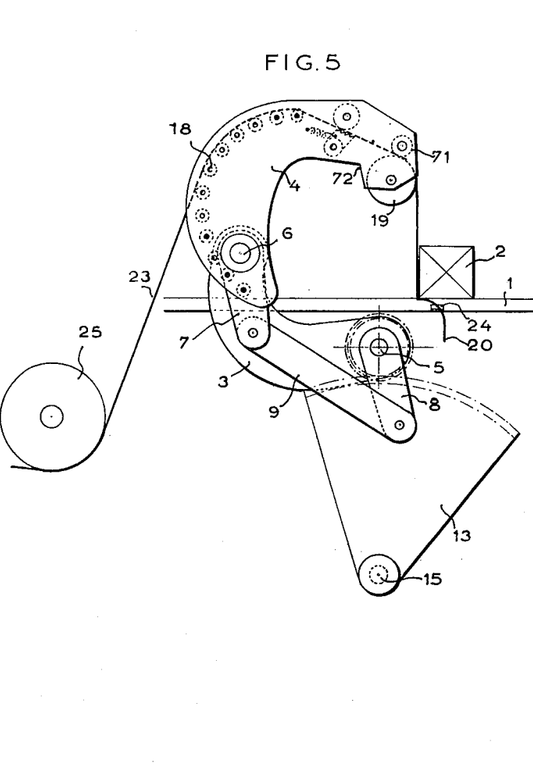

The following stage is shown in FIGURE 5. The pulley 19 is raised substantially vertically and the wire 23 has made contact with the series of rollers such as 18 placed between the two webs 16 and 17 constituting the angle arm 4 (see FIGURE 8).

In the following stage shown on FIGURE 6, the two angle arms 3 and 4 encircle almost completely the object 2 to be tied; the wire 23 now passes over all the rollers 18 and the prooved pulley 19 now occupies a position substantially symmetric with that which it occupied in FIGURE 3 with respect to the axis of rotation 31 of the twisting head. The grippers 32, symmetric with the grippers 24 with respect to this axis, seize the wire 23 at a point where the latter passes over the grooved pulley 19.

In this position, the edge 72 of the yoke 70 is flush with the upper plane of the table 1; the yoke 70 has a position substantially symmetric with that which it occupied in FIGURE 3 with respect to the axis 31. For a more efficient working of the assembly, it is preferable that the axis x'—x, which joins the shaft 6 in the position of FIGURE 6 to the point A which was the location of the same shaft in the position of FIGURE 3, should pass through the point O, and that this axis should be perpendicular to the plane y—y' passing through the point O and the axis of the shaft 5.

Figures 6, 7:
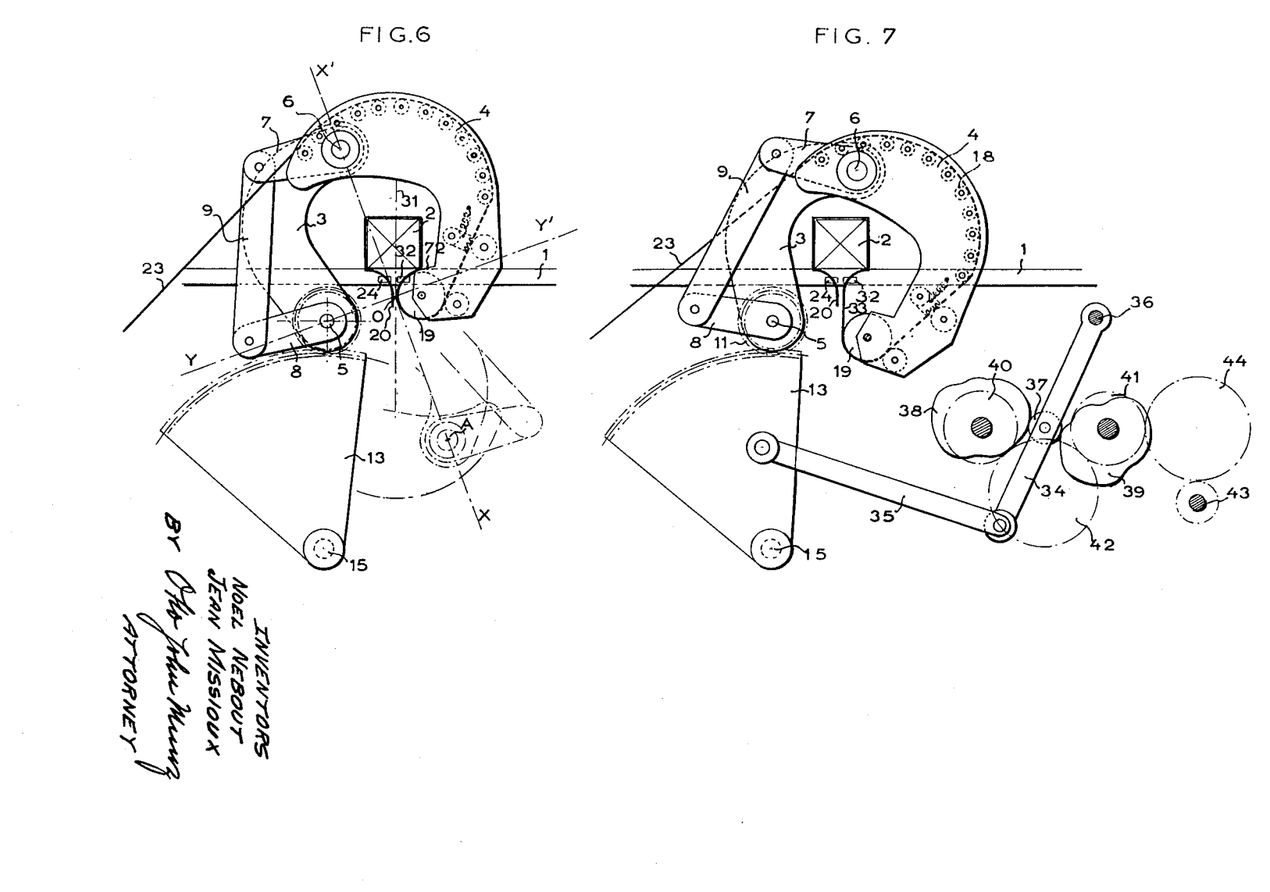

The following stage is shown in FIGURE 7; the grooved pulley 19 has descended vertically and the wire which has been seized by the grippers 32 now forms a more or less vertical part 33 parallel to the free end 20.

On this figure there is also shown by way of illustration a method of driving sector 13 in rotation; it will be seen that this sector 13 is connected to the lever 34 by means of the connecting link 35. The lever 34 can pivot about the fixed axis 36 and carries in its median part a roller 37 which is placed between two cams 38 and 39 of suitable shapes. These two cams are driven in rotation by the toothed pinions shown at 40 and 41, which turn in the same direction and the rotations of which are linked by means of the pinion 42 freely mounted on its shaft. The rotation of the assembly of the pinions 40 and 41 is produced by the rotation of the driving pinion 43 through the pinion 44 which drives the pinion 41. The shape of the cams 38 and 39 is such that, when the pinion 43 turns with a steady speed, the successive positions of the angle lever 3, driven by the sector 13, correspond to the successive stages shown in FIGURES 2 to 7. At the same time another pair of cams drives in the same way the toothed sector 14 which acts on the positions of the angle lever 4 relative to the angle lever 3.

The end of wire being now passed around the package 2, the following operations consist first of cutting and then of twisting together the two free ends of the wire. These two operations are effected by a device according to the invention and which will now be described with reference to FIGURE 9. This device has not been shown in the preceding figures for reasons of clarity in the drawings.

Figure 9:
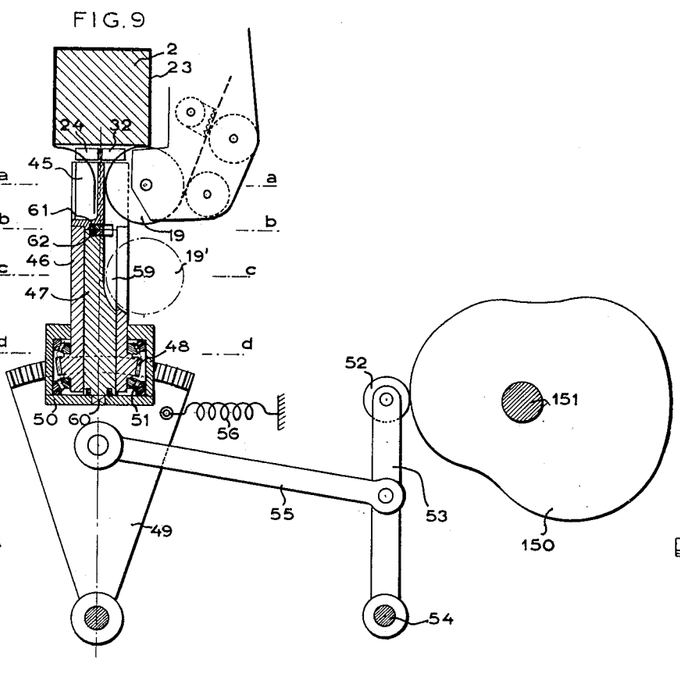
FIGURE 9 represents the assembly of the twisting and cutting device.
Figure 9A:
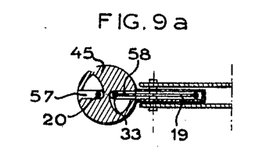
FIGURES 9a, 9b, 9c, 9d are cross-sections of FIGURE 9 on the lines a—a, b—b, c—c, d—d.

In FIGURE 9 is shown the package 2 encircled by the wire 23 of which the two ends are held beneath the package by the gripper devices shown at 24 and 32; below these two gripper devices is a cylindrical head 45 rigid with a sleeve 46 enclosing a fixed column 47. The sleeve 46 can be driven in rotation by a toothed rim 48 engaging with a toothed sector 49; the toothed rim 48 is located in a fixed case 50 and is supported by bearings such as 51. This can also be seen in FIGURE 9d, which is a horizontal section on the line d—d of FIGURE 9. The sector 49 can be driven by the rotation of a cam 150 which rotates about a shaft 151 and on which rolls a roller 52 located at the end of an arm 53 which is pivoted about the fixed shaft 54 and which, by means of the connecting rod 55, drives the sector 49 in rotation; the sector 49 is biased by the spring 56. The result is that angular movement of the lever 53 produces rotation of the head 45. The head 45, which is also shown in FIGURE 9a, which is a horizontal section on the line a—a in FIGURE 9, has a generally cylindrical shape; it has two vertical grooves 57 and 58 the width of which is a little larger than the diameter of the wire. In the position shown in FIGURE 3 the grooves 57 and 58 (not shown in this figure) are orientated transversely with respect to the package and the grooved pulley 19 is inserted in the groove 57; the free end of the wire 20 is then in the position which is shown in FIGURE 9a (in which the pulley 19 is not shown in the position which it has in FIGURE 3). After the various stages of tying, and when the two levers 3 and 4 have the position shown in FIGURE 6, the pulley 19, having completely encircled the package, is inserted in the groove 58 and then has the position shown in FIGURE 9. It is shown in section in FIGURE 9a, together with the vertical end 33 of the wire.

It will be remembered that the stage which follows that in which the pulley 19 has the position shown in FIGURE 9, is followed by that in which the grooved pulley has the position shown at 19'. At this moment the grooved pulley is no longer in the groove 58 cut in the cylindrical head 45, but in a groove 59 cut in the column 47. Reference can be made to FIGURE 9c which is a horizontal section on the line c—c of FIGURE 9.

Figure 9B:
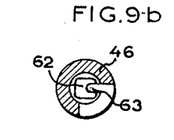
Figure 9C:
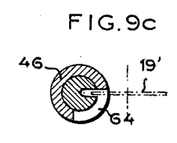
Figure 9D:
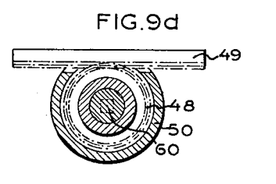

It will be remembered that this column 47 is fixed, its rotation being prevented by the squared end 60 (FIGURES 9 and 9d).

FIGURES 10a, 10b, 11a, 11b show the action of the grippers which are represented at 24 and 32 on the preceding figures.

Figures 10A, 10B:
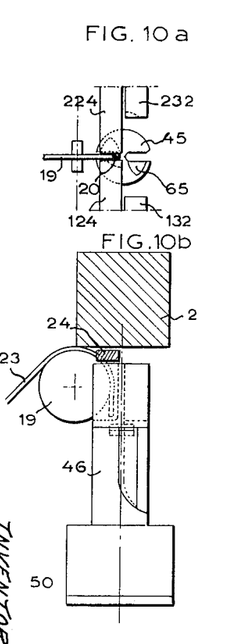

FIGURE 10a, which is a plan view, shows that the grippers 24 are constituted by two jaws 124 and 224 which grip the free end 20 of the wire. In this figure, as in FIGURE 10b, the grooved pulley 19 is represented in the position corresponding to that of FIGURE 3; the grippers 32, of which the two jaws are indicated at 132 and 232, are open.

Figures 11A, 11B:
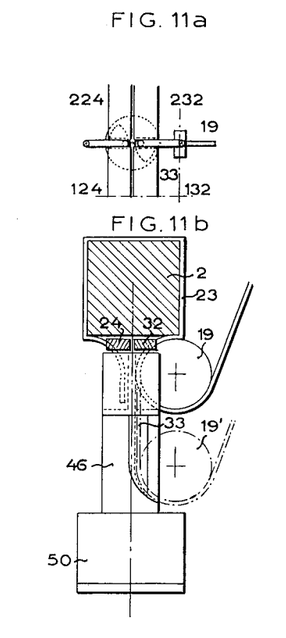

In FIGURES 11a and 11b, which correspond to the position shown in FIGURES 6 and 9, the grippers 32 are closed and have gripped the part 33 of the wire.

Figures 12A, 12B, 12C:
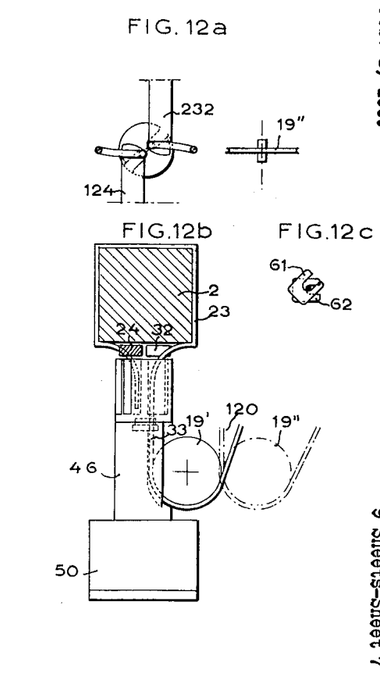

When the pulley passes from the position 19 to the position 19' (FIGURE 9 or 11b), the action of the closed grippers 32 causes the production of the vertical part 33 of the wire. Up to that point and since the beginning of the tying operation, the head 45 has remained motionless, which means that the roller 52 (FIGURE 9) has been rolling over a circular part of the cam 150; in the course of the following operation, the wire must be cut. To begin with, the grippers 24 and 32 open, but the jaws 124 and 232 remain in place; this position is shown in FIGURES 12a and 12b. The retaining in place of the jaws 124 and 232 is rendered necessary by the operation which follows that of the cutting of the wire, namely the twisting operation, in order to prevent the wire being caused to rotate during the twisting. Returning again to FIGURE 9, the cylindrical head 45 comprises a knife blade 61 which is placed opposite a knife blade 62 fixed to the stationary column 47.

FIGURE 9b is a horizontal section on the line b—b in FIGURE 9. The sleeve 46, rigid with the cylindrical head 45, is shown in section; the knife blade 61 is not visible, but the knife blade 62 is shown. It will be remembered that it is fixed to the stationary column 47 and consequently it does not rotate. This knife blade 62 has a groove 63 into which passes the wire to be cut. The movable knife blade 61 (not shown in FIGURE 9b) is similar to the knife blade 62.

The grooved pulley 19 passes to the position 19' (FIGURE 9 or FIGURE 11b) in the course of the following stage; the roller 52 leaves the circular part of the cam 150 and withdraws from the shaft 151 which causes, through the connecting link 55, the sector 49 and the rim 48, the rotation of the sleeve 46 which drives the cylindrical head 45. The sleeve 46 has a sectored hollow 64 (FIGURE 9c), which permits this rotation in spite of the presence of the grooved pulley 19 occupying the position 19'.

Figure 13A:
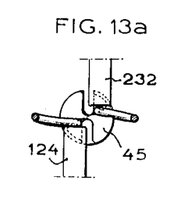
Figure 13B:
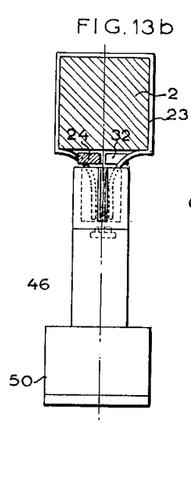
Figures 13C, 14B:
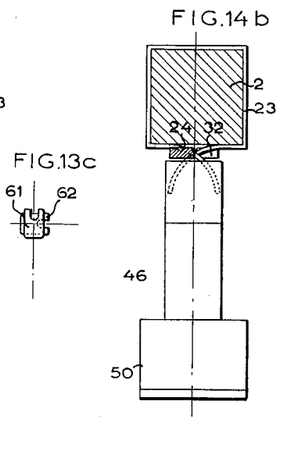
Figure 14A:
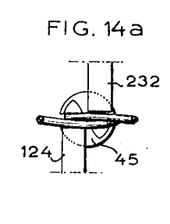
Figure 15A:
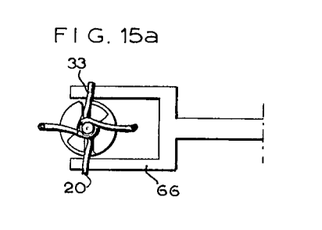
Figure 15B:
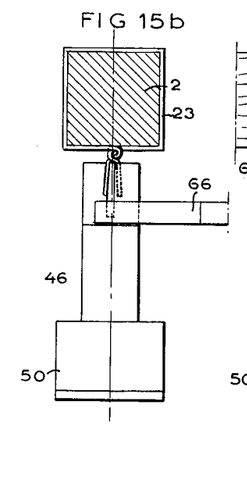

The rotation of the head 45 drives the knife blade 61 and at the end of one eighth of a turn the latter takes the position, in relation to the knife blade 62, which is represented in FIGURE 12c, and the wire is cut. The head 45 continues to turn; at the end of one quarter of a turn the knife blades have the position shown in FIGURE 13c and the wire is in the position shown in FIGURES 13a and 13b. It will be seen that the grooves 57 and 58 in the cylindrical head 45 have in their upper parts a flared side 65, which is clearly visible in FIGURE 10a. This arrangement has the effect of allowing the wire to slide on the upper part of the head 45 during twisting. FIGURES 14a and 14b show the position of the wire when the head has made a half-turn from the position which it had in FIGURES 11a and 11b; FIGURES 15a and 15b correspond to a total rotation of the head 45 of one turn and a quarter; the free ends 20 and 33 are now at right angles to the loop which the wire forms around the object to be tied.

Figure 16:
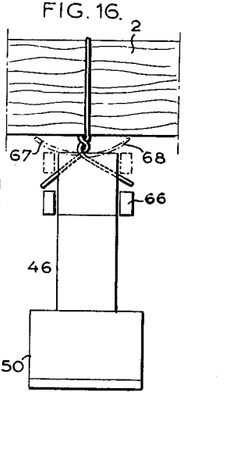
FIGURE 16 is a longitudinal view explaining the turning down of the ends of the wire and,
FIGURE 17 represents an example of cams controlling the movements of the articulated member.

The last operation consists of folding back the free ends and it is effected by means of the fork 66; they then take the position represented at 67 and 68, in FIGURE 16, in which the package 2 to be tied is shown along its longitudinal dimension. During this time the pulley 19 passes from the position 19' to the position 19" (FIGURE 12b) and the wire 23 then forms an end shown at 120 which plays the part of a free end 20 for the encirclement of the following package. The angle arms 3 and 4 driven by their respective cams again take the position shown originally in FIGURE 2. The tied object 2 is completely freed; it can be taken away by the previously described means and replaced by the following object, on which the same tying operations will be effected.

In the course of the description of the tying machine, a certain number of cams have been mentioned, namely: the cam 101 which causes the movement of the levers 106 and 110 (FIGURES 1a and 1b), the cams 38 and 39 which cause the movement of the angle arm 3 through the toothed sector 13 (FIGURE 7), other cams, not shown, causing the relative movement of the angle arm 4 through toothed sector 14 (FIGURE 8), and the cam 150 controlling the rotation of the cylindrical head 45 through the toothed sector 49 (FIGURE 9). The movement of the fork 66 (FIGURE 15a) as well as the opening and closing of the grippers 24 and 32 can also be controlled by cams. All these cams make one complete turn for one complete tying operation. They have a shape appropriate to their function.

Figure 17:
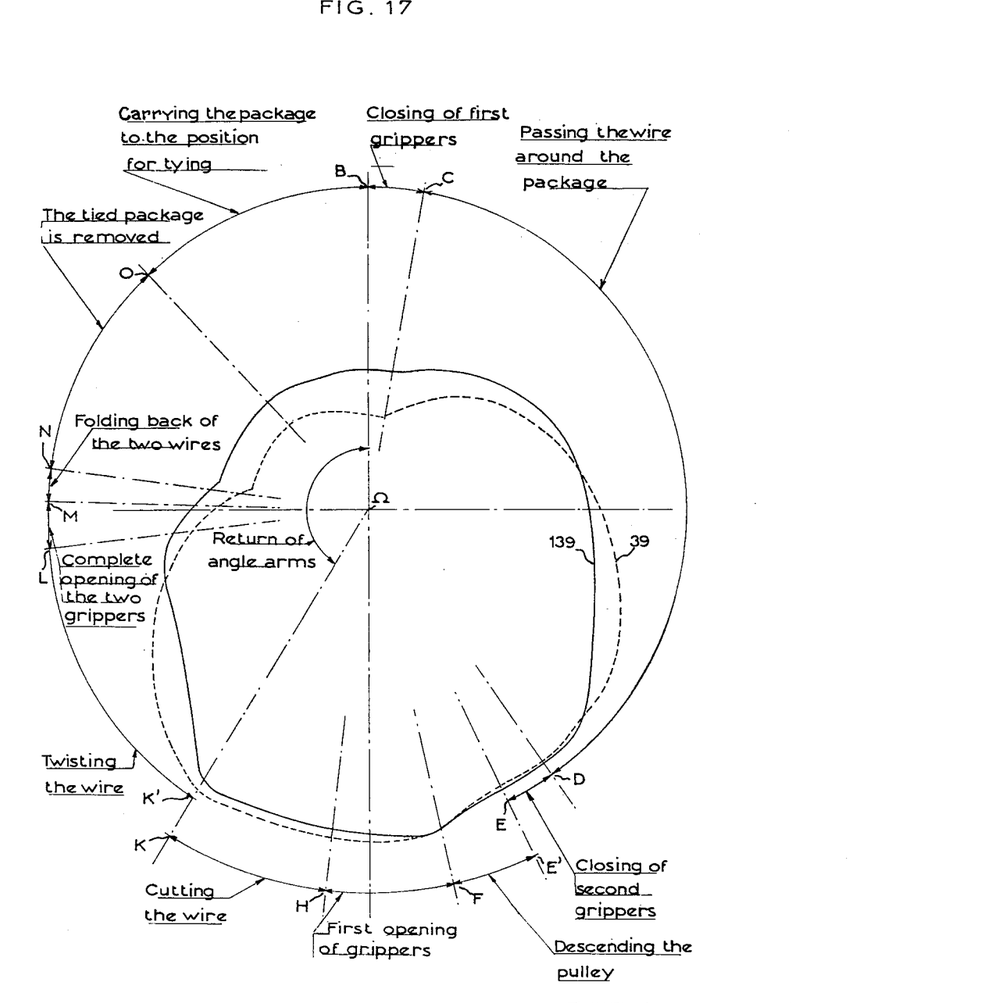

The cams of which the shape must be chosen with the greatest care are those which control the movement of the angle arms. An example of the design of these cams is shown in FIGURE 17 at 39 and 139. They turn in synchronism around the centre Ω. The various periods of the cycle of operation are distributed over the arcs of the circumference.

The beginning of the cycle is at O.

While the cam turns through the arc OB, the package is carried to the position for tying and the angle arms 3 and 4 pass from the position of FIGURE 2 to that of FIGURE 3. The arc BC corresponds to the closing of the grippers 24, the wire being in the position of FIGURE 3.

The arc CD corresponds to the stages of passing the wire around the package, from FIGURE 3 to FIGURE 6 inclusive.

The arc DE corresponds to the closing of the grippers 32 (FIGURE 6).

The arc E'F corresponds to the transition from the position of FIGURE 6 to that of FIGURE 7.

The arc FH corresponds to the transition from the position of FIGURE 11a to that of FIGURE 12a.

The arcs HK and K'L correspond to the cutting and twisting operations; while the second of these operations is effected, the angle arms 3 and 4 return towards the position of FIGURE 2.

The return of the arms continues during the period corresponding to the arcs LM (complete opening of the two grippers) and MN (the folding back of the two wires, FIGURE 16).

During the arc NO the tied package is removed; the cycle begins again with the tying of the following package.

The detailed description of an example of a machine according to the invention has been given for the case of tying a package of elongated shape.

It is clear that the device specific to the invention, that is to say the operative combination of the articulated member composed of an angle arm and a forward angle arm, of a cutting and twisting head and of an assembly of grippers, can equally well be used for the tying of a package of annular form, on condition that the device for placing and holding the package during the tying operation is appropriate to the handling of such packages.

We claim:

1. A machine for tying packages with wire, comprising, a horizontal platform having an opening therein defining a tying position, a twisting head mounted for rotation about a vertical axis beneath said tying position, said head having therein first and second axially-extending, diametrically-opposed radial slots, means operable to move a package on said platform to said tying position, a shaft journaled for rotation on an axis parallel with and adjacent said platform, a first crank arm having one end fixed to said shaft, a second crank arm pivoted at one end to the free end of said first crank arm, a pulley having a grooved rim and journaled on the free end of said second crank arm, a non-return wire-engaging device carried by said second crank arm, a length of wire extending to said second crank arm, through said wire-engaging device and about said pulley, first and second gripper means each positioned on a respective side of said vertical axis and between said head and said tying position, means associated with said head and operable to sever wire in said second slot, a motor, and driving connections between said motor and said head, said first and second crank arms, said gripper means, and said severing means to sequentially (a) pivot said arms to move said pulley into said first slot, (b) to actuate said first gripper means to grip and hold the wire in said first slot, (c) to pivot said arms to effect revolution of said pulley and wire about a package at said position and movement into said second slot, (d) to actuate said second gripper means to grip and hold the wire in said second slot, to lower said pulley within said second slot, (e) to move said pulley out of said second slot, and (f) to rotate said twisting head to thereby first sever said wire and thereafter twist together the ends of said wire extending into said slots.

2. A machine for tying packages with wire, comprising, a horizontal platform having an opening therein, a twisting head mounted beneath said platform and opening, for rotation about a fixed vertical axis, said head having therein first and second axially-extending, diametrically-opposed radial slots, means operable to move a package on said platform to tying position over said opening, a drive shaft journaled for rotation on a horizontal axis below said opening, a first crank arm fixed at one end to said shaft, a second crank arm pivoted at one end to the free end of said first crank arm, a pulley having a grooved rim and journaled on the free end of said second crank arm, a non-return wire-engaging device carried by said second crank arm, a store of wire including a length extending from said store through said non-return device thence about said pulley, first and second gripper means each positioned on a respective side of said vertical axis between said twisting head and said tying position, means associated with said twisting head and operable to sever said wire in response to turning thereof, a motor, driving connections from said motor to said first and second crank arms and said gripper means to effect movements thereof, in succession, from an initial position, to position said pulley within said first slot and actuate said first gripper means to hold the wire in said first slot, to pivot said arms to move said pulley out of said first slot and revolve the same about a package on said platform to thereby pass a length of wire about said package and into said second slot, to lower said pulley in said second slot, to actuate said second gripper means and hold the wire in said second slot, to rotate said head to first sever the wire in said second slot and thereafter to twist together the ends of the wire in said slots, and to reversely pivot said arms to return said pulley to initial position.

3. A machine for tying packages with wire, comprising, a platform having an opening therein defining a tying position, a twisting head below said opening and mounted for rotation about an axis normal to said platform, said head having therein first and second, diametrically opposite, radially and axially extending slots, a shaft journaled below said platform for rotation about an axis parallel thereto, a first crank arm having one end fixed to said shaft, a second crank arm having one end pivoted to the other end of said first crank arm, a pulley having a grooved rim and journaled on the free end of said second crank arm, a non-return wire-engaging device carried by said second crank arm, a supply of wire having a diameter greater than the axial dimension of said pulley and extending through said non-return device and over and about said pulley, first and second grippers associated with said twisting head and positioned on opposite sides of the first-mentioned axis thereof adjacent respective ones of said slots, means rotatable with said head for severing said wire within said second slot, a motor, and means driven by said motor to rotate said shaft, said crank arms, said grippers and severing means, starting from an initial position, to move said pulley into said first slot, operate said first gripper to hold the wire within said first slot, pivot said arms to move said pulley and wire in a complete revolution about said package and into said second slot, operate said second gripper to hold the wire in said second slot, rotate said head to first operate said severing means and thereafter twist together the cut ends of said wire to secure the same about the package, and reverse pivoting of said crank arms to return said pulley to said initial position.

4. In a machine for positioning a metallic wire about a package, a horizontal platform to support a package to be tied, a twisting head mounted for rotation below said platform and having first and second diametrically opposed slots therein, a first crank arm mounted at one end for rotation about a fixed axis, a second crank arm pivoted at one end to the free end of said first crank arm, a wire-laying pulley journaled at the free end of said second crank arm, and means connected with said crank arms and operable to pivot the same to move said pulley from a first position within said first slot, completely about a package on said platform, and into a second position within said second slot.

5. In a machine for wrapping a length of metallic wire about a package, a platform to support a package to be wrapped, a twisting head mounted below said platform for rotation about an axis, said head having first and second, diametrically-opposite slots therein, a first crank arm mounted at one end for rotation about an axis below said platform, a second crank arm pivoted at one end to the free end of said first crank arm, a wire-laying pulley journaled on the free end of said second crank arm, and means operable to pivot said crank arms to move said pulley in a fixed path about a package on said platform, from a first position within said first slot, to a second position within said second slot.

6. A machine for tying packages with wire, comprising, a horizontal platform, having an opening defining a tying position, means operable to position a package to be tied at said position, a twisting head journaled beneath said opening for rotation upon a vertical axis, said head having diametrically opposed radial slots therein, wire cutting means associated with said twisting head, a horizontal drive shaft rotatably mounted adjacent said head, a first crank arm having one end fixed to said shaft, a second crank arm pivoted at one end to the free end of said first crank arm, a grooved pulley journaled on the free end of said second crank arm, a non-return wire-engaging device mounted on said second crank arm, a supply of wire including a length extending through said non-return device and about said pulley, first and second wire grippers positioned on respective sides of said axis, between said head and said tying position, a motor, and driving connections between said motor and said head, shaft, crank arms and grippers, to (a) pivot said crank arms to move said pulley from an initial position, into said first slot, (b) to operate said first gripper to hold the wire in said first slot, (c) to pivot said arms to pass the pulley and wire in a complete revolution about a package on said platform at said tying position, and into said second slot, (d) to operate said second gripper to hold the wire in said second slot; (e) to pivot said arms to move said pulley downwardly in and along said second slot, (f) to operate said cutting means to sever the wire in said second slot, (g) to move said pulley out of said second slot; (h) to turn said head to twist together the ends of said wire in said slots; and (i) to reversely pivot said arms to return said pulley to said initial position.

References Cited in the file of this patent

UNITED STATES PATENTS

| | | |
|---|---|---|
| 186,186 | Withington | Jan. 9, 1877 |
| 764,318 | Towner | July 5, 1904 |
| 1,115,290 | Eberling | Oct. 27, 1914 |
| 2,733,652 | Dwyer | Feb. 7, 1956 |
| 2,829,681 | Wadsworth | Apr. 8, 1958 |
| 2,831,356 | Wiman | Apr. 22, 1958 |